United States Patent [19]

Marotto

[11] 3,826,119
[45] July 30, 1974

[54] NUMERICAL CONTROL SYSTEM FOR PRESS BRAKES AND THE LIKE
[75] Inventor: Alan P. Marotto, Lexington, Mass.
[73] Assignee: Automec, Inc., Waltham, Mass.
[22] Filed: June 5, 1972
[21] Appl. No.: 259,439

[52] U.S. Cl. .......................... 72/36, 72/461, 72/7, 72/DIG. 21
[51] Int. Cl. ............................................ B21d 11/22
[58] Field of Search ............. 72/36, 461, DIG. 21, 7

[56] References Cited
UNITED STATES PATENTS

| | | | |
|---|---|---|---|
| 784,726 | 3/1905 | Yates | 72/461 |
| 2,510,768 | 6/1950 | Williamson | 72/DIG. 21 |
| 3,176,556 | 4/1965 | Roberts et al. | 83/71 |
| 3,245,556 | 4/1966 | Thumim | 83/71 |
| 3,421,359 | 1/1969 | Gibbs | 72/DIG. 21 |
| 3,618,349 | 11/1971 | Roch | 72/36 |
| 3,717,061 | 2/1973 | Daniels | 83/409 |

Primary Examiner—Charles W. Lanham
Assistant Examiner—M. J. Keenan
Attorney, Agent, or Firm—Morse, Altman, Oates & Bello

[57] ABSTRACT

A numerical control system is provided for use with press brakes and the like for automatically gauging in sequence a plurality of different bending operations. The system includes a gauge mounted to the press brake bed and is provided with a carriage driven by a motor-operated lead screw which moves the carriage to different gauging positions in accordance with predetermined instructions set into a controller. A pivoted gauging finger is mounted on the carriage to serve as a gauge stop for the work fed between the punch and die of the brake. A closed loop digital to analog servo system is provided in the control of the carriage to cause rapid and precise movement of the gauge in accordance with the programmed instructions.

5 Claims, 4 Drawing Figures

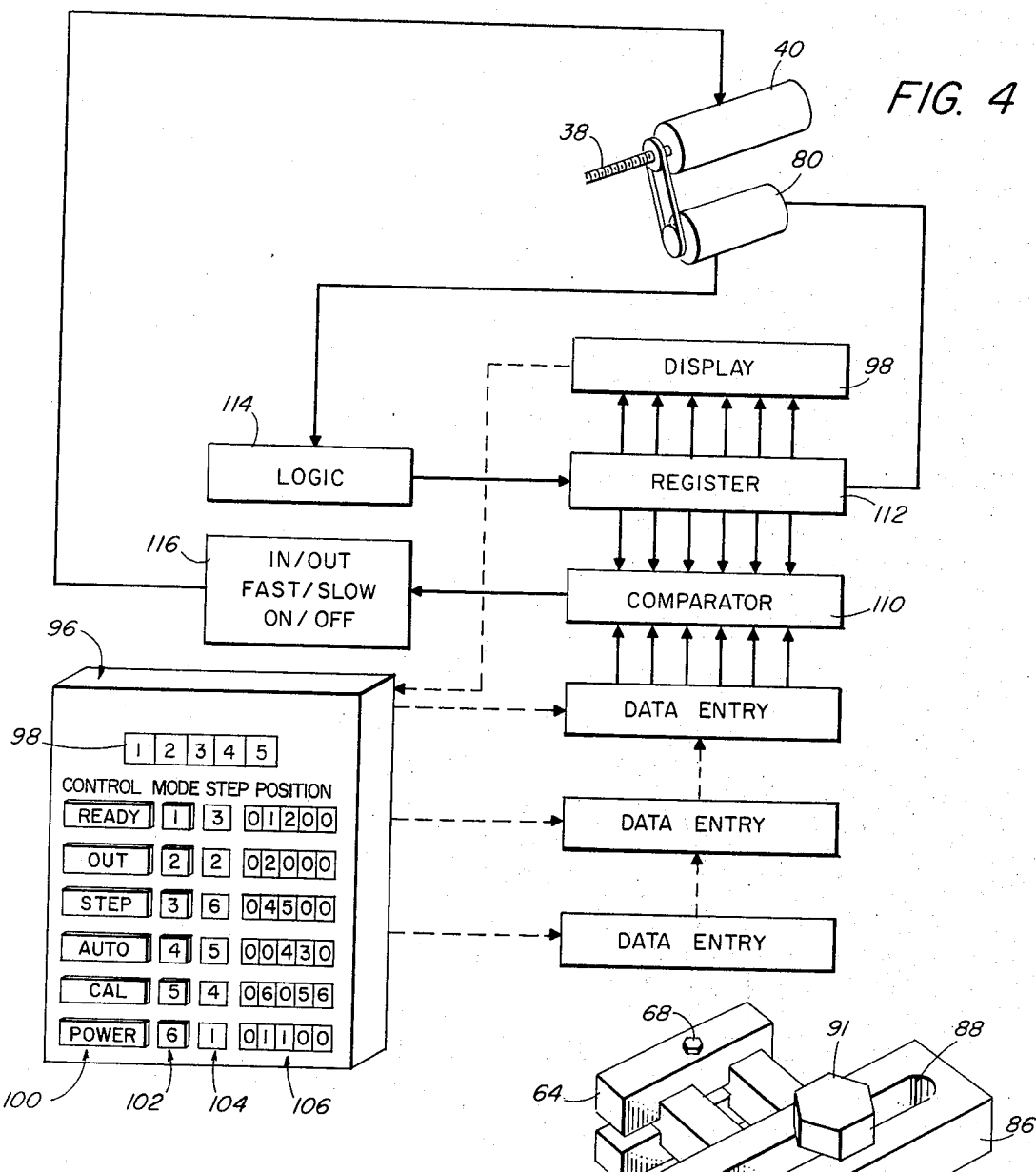
FIG. 4
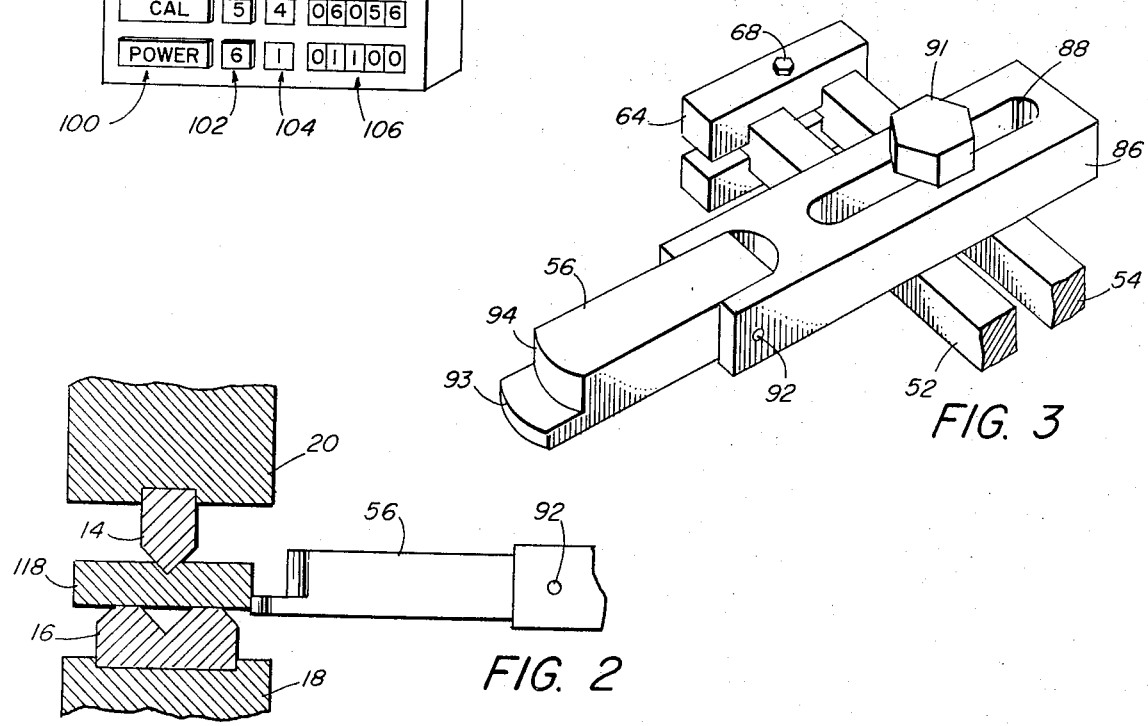
FIG. 3
FIG. 2

NUMERICAL CONTROL SYSTEM FOR PRESS BRAKES AND THE LIKE

BACKGROUND OF THE INVENTION

1. Field of the Invention

This invention relates generally to numerical controls for machinery and more particularly is directed towards a new and improved programmable automatic gauge for use particularly with press brakes, shears, punch presses, and the like to provide automatic, programmed operation thereof.

2. Summary of the Prior Art

When an operator uses a conventional press brake on a production run of identical parts involving several different bends, he must first set up his gauge for the first bend and then run through the entire stock of parts to make a single bend in each part. Once the first bends have been completed he must then reset the gauge for the second bend and repeat the process of running through the entire stock for each bend that is to be made. The gauge must be reset each time a different bend is to be made and the part must be handled in a separate operation for each bending operation. The process thus is quite slow by reason of the need to manually reset the gauge for each different bend.

While automatic gauging equipment has been provided heretofore for this type of machinery in an effort to reduce the handling of parts by the operator, such equipment heretofore has not proven to be entirely satisfactory from the standpoint of cost, speed of operation, convenience, reliability and flexibility of operation.

Accordingly, it is an object of the present invention to provide an automatic gauging apparatus for use with press brakes and the like whereby a plurality of different gauging steps may be selectively programmed by the operator to permit a number of different bends to be carried out on a part in a single handling thereof. A further object of this invention is to provide a low cost, high speed automatic gauge adapted to be preprogrammed to carry out a variety of gauging operations and provide progressive bending of parts set into the machine.

SUMMARY OF THE INVENTION

This invention features an automatic point to point gauging system for use with press brakes and the like, comprising a frame adapted to be mounted to the bed of the press brake and providing a guideway for a carriage movably mounted thereon. A lead screw is drivingly connected to the carriage and a servo motor is coupled to the lead screw for moving the carriage back and forth along the ways in accordance with preprogrammed instructions. The servo motor is connected to a control system employing a feed back loop for confirming the position of the carriage. A control panel is equipped with digital switches by which program data is entered by the operator into the system and a digital display is provided at the panel to indicate gauge position. A pivoted finger is mounted on the carriage to provide precise alignment of the apparatus and to serve as a stop for work fed into the brake.

BRIEF DESCRIPTION OF THE DRAWINGS

FIG. 2 is a detailed view in side elevation of the gauging finger in an alignment position, FIG. 3 is a detailed perspective view of the gauging finger, and, FIG. 4 is a somewhat schematic diagram of the control components of the system.

DETAILED DESCRIPTION OF THE PREFERRED EMBODIMENT

Figure 1:
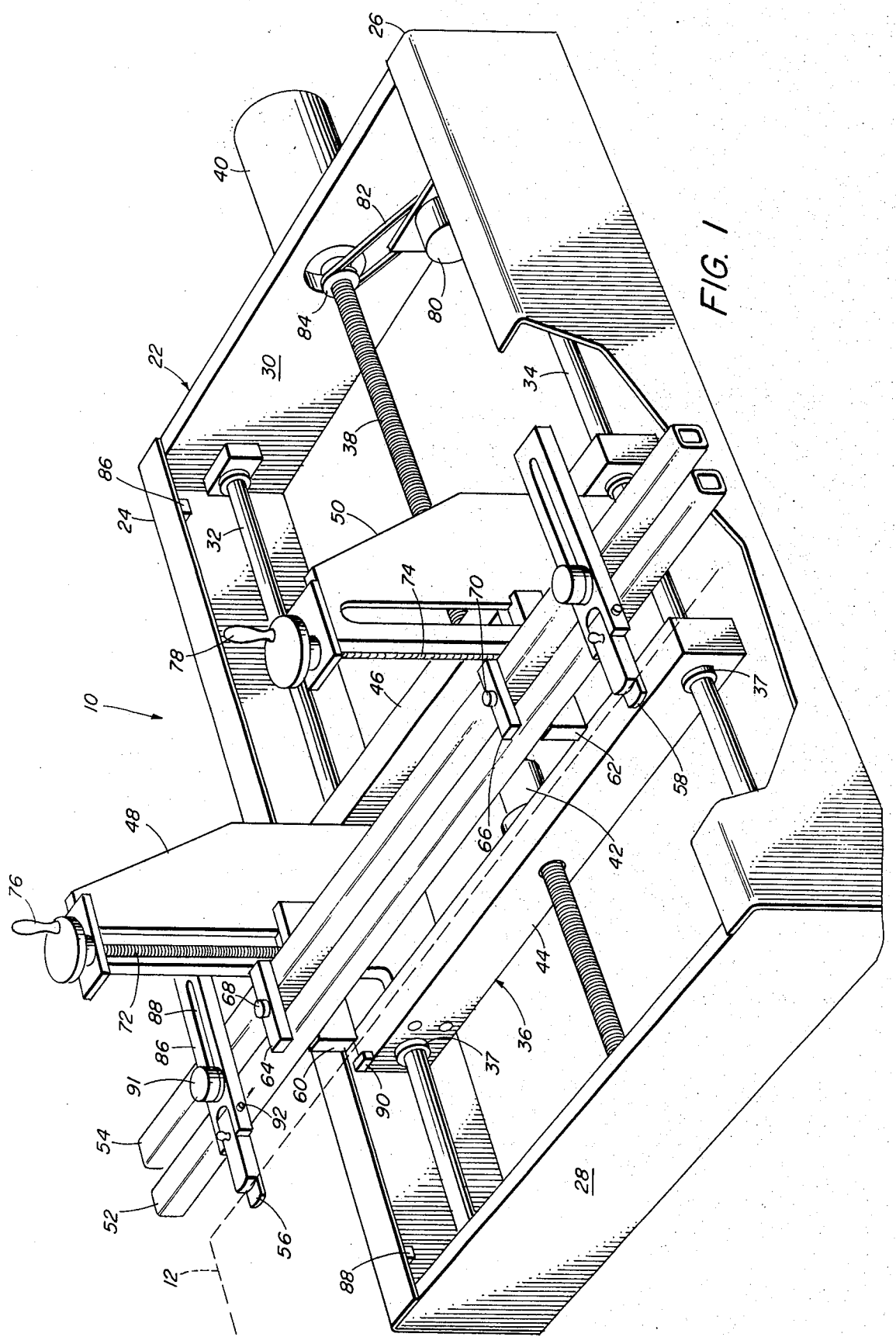
FIG. 1 is a view in perspective, partially cut away, of a gauging apparatus made according to the invention.

Referring now to the drawings, the reference character 10 generally indicates an automatic gauge for use with a press brake, shear, punch press or the like. When used with a press brake the apparatus is bolted to the bed of the brake on the backside thereof in position to control or gauge a piece of work 12 fed by an operator between a punch 14 and die 16 mounted to a press brake bed 18 and press brake ram 20.

The mechanical portion of the gauging apparatus is generally organized about a rigid boxed frame 22 comprised of side walls 24 and 26 and end walls 28 and 30 between which are mounted parallel ways 32 and 34 slidably supporting a carriage 36. The ways 32 and 34 preferably are in the from of hardened metal cylindrical stock of the type known as Thompson ways adapted to provide precise linear support for the slidable carriage 36 which is equipped with ball bushings 37 in engagement with the ways. Between the ways 32 and 34 is a ball or lead screw 38 rotatably mounted at its ends to the end walls 28 and 30 and drivingly connected to a servo motor 40 mounted to the rear face of the end wall 30. The ball screw 38 drivingly connects with the carriage 36 by means of a pair of loaded ball nuts 42 mounted to carriage frame cross pieces 44 and 46. The upright members serve to support and position crossbars 52 and 54 which carry gauge fingers 56 and 58. The crossbars typically are of tubular square stock clamped onto elevator arms 60 and 62 extending forwardly of and carried by the upright members 48 and 50. Blocks 64 and 66 are provided together with bolts 68 and 70 for clamping the crossbars 52 and 54 to the arms 60 and 62. Crank handles 76 and 78 are provided at the upper ends of the lead screws 72 and 74 to permit easy rotation thereof to raise or lower the crossbars 52 and 54 together with the gauge fingers 56 and 58 whereby the gauge fingers may be horizontally aligned with the punch 14 and die 16.

The frame 22 also carries a shaft angle encoder 80, preferably of the optical type, drivingly connected to the ball screw 38 by a flexible belt and pulley 82 and 84, respectively, or by means of a chain and sprocket coupling to insure a non-slip connection between the ball screw and the encoder. The frame is also provided with limit switches 86 and 88 at either end of the path of travel of the carriage to prevent overtravel of the carriage in either direction. The limit switches may be mechanically actuated by a trip carried on the carriage or the switches may be magnetically actuated reed devices responsive to a pair of magnets 90 positioned on the carriage to actuate the switches 86 and 88.

Each of the gauge fingers 56 and 58 is mounted for horizontal pivoting about a gauge bar 86 formed with a slot 88 and clamped onto the crossbars 52 and 54 by means of a nut and bolt 91. The forward end of the gauge bar 86 is bifurcated to receive the rear end of the finger 56 pivoted by means of a pivot pin 92 extending through both the gauge bar and the finger. The opposing end faces of the finger and gauge bar are profiled so that the finger 56 is prevented from pivoting downwardly beyond a horizontal position but is free to pivot upwardly through an angle of perhaps 90°. The pivotal gauge fingers serve as stops for work pieces fed into the press. By being mounted in a pivotal fashion, the fingers are free to flip upwardly so that, after the work is in position, the finger will not be damaged in the bending process if the work is displaced upwardly by the force of the press insofar as the finger is free to yield. The fingers are preferably made of hardened steel and are designed for edge gauging, close die gauging and corner gauging. The forward end of the finger is stepped to form a pair of shoulder stops 93 and 94 with the forward faces of each being slightly rounded to insure that the work placed thereagainst will be precisely positioned. The work may be brought to bear against either face 93 or 94 depending upon the nature of the bend.

The system is operated by means of a control panel 96 conveniently located at the front of the press on a stand or bracket, for example, to be readily visible and accessible to the operator. As best shown in FIG. 4 the panel 96 includes a numerical display 98 typically a 5 digit Nixie display to indicate absolute gauge position. Below the position display 98 is a group of functional switches including a vertical row of control buttons 100, a vertical row of step indicators 102, a vertical row of code selectors 104 and a vertical row of position switches 106 by which numerical data is entered into the system. The control button labeled "READY" illuminates when the gauge is stopped and is in position for a bending operation. The "OUT" switch is employed to retract the gauge to its maximum position, typically 29 inches, in order to clear the work area. The "STEP" switch is employed to advance the gauge to its next programmed position. The "AUTO" switch when in an automatic mode is illuminated and actuates the step advance. The "RESET" switch stops the gauge and automatically resets the system to step I and calibrates the mechanical system once the STEP switch is actuated. The "POWER" switch is employed to energize the system.

The step indicators 102 are lamps that are illuminated for each step in process for any particular sequence. The code selector switches 104 determine the position, repetition and direct or indirect positioning of the gauge as follows:

| CODE | DEFINITION |
|---|---|
| 0 | Off |
| 1 | Repeat previous position |
| 2 | Out from previous position |
| 3 | In from previous position |
| 4 | Off |
| 5 | Repeat previous position twice |
| 6 | Out, repeat present position |
| 7 | In, repeat present position |

The position selectors illustrated are six in number and are provided with five digit rotary switches by which the operator can dial in gauge positions, typically ranging from 00.000 inches to 29.999 inches where the path of travel of the gauge is 29.99 inches. Obviously, this range can be increased or decreased as desired and the number and type of selectors can be varied.

The dial switches 106 provide data entry into a comparator 110 which also receives inputs from a register 112 in a feed back loop connected to the optical shaft angle encoder 80. The register receives positional data from the encoder through logic circuitry 114 and the information fed from the register into the comparator which compares the program data from the position selector with the feedback data to insure the actual position of the gauge corresponds with the program position. The comparator feeds the instructional data into control circuitry 116 connected to the servomotor 40 driving screw 38 which moves the carriage 36. The loop arrangement thus provides a positive feed back to insure that the actual position of the gauge corresponds exactly with the programmed position set in by the operator.

In order to eliminate any backlash in the system, the control may be programmed to over travel the gauge by perhaps a quarter turn of the lead screw, for example, when moving from one position to another. Once it is moved beyond the intended position by the quarter turn, the screw is then returned to its correct position at which point the "READY" light goes on and the operator can make his bend.

The gauge initially is aligned by loosening the gauge clamps and withdrawing the gauge fingers. The operator then depresses the RESET button, switches the AUTO button mode to off, enters 02.000 inches into step I preset and depresses the STEP switch. The gauge will then cycle and stop. The ram is then jogged down to clamp a pair of self-aligned reference bars 118 between the forming bars as suggested in FIG. 2 and the operator may, if necessary, adjust the height by operation of the cranks 76 and 78 as necessary. Once in position, the clamps are tightened and the ram is released. The system is now aligned and need not be re-aligned until such time as the forming dies are changed. When setting up the system to form a part with multiple bends, the operator enters the proper dimensions and code selection on the control panel, depresses the RESET, switches the AUTO mode on and depresses the STEP switch. The operator then forms six bends in the first piece and checks the piece for accuracy. After dialing in any corrections that may be necessary he then begins his production run.

The system is extremely fast and the gauge will move directly from one gauging position to another without going to the end of its path of travel. Production time in bending the parts is materially reduced and the product quality and uniformity from run to run is vastly improved.

Having thus described the invention what we claim and desire to obtain by Letters Patent of the United States is:

1. An automatic gauge for press brakes and the like, comprising
   a. a frame mountable to said brake and formed with a guideway, said guideway including a pair of spaced parallel cylindrical members,
   b. a carriage mounted to said frame for movement along said guideway, said carriage including ball bushings engaging said members,
   c. at least one gauge stop mounted to said carriage and adapted to engage a workpiece fed into said brake, d. a lead screw rotatably mounted to said frame parallel to said guideway members and in driving threaded engagement with said carriage,
e. a reversible servo motor drivingly connected to said screw,
f. selectively variable numerical control means including a plurality of variable digital switches operatively connected to said motor for providing programmed signals to said motor whereby said carriage may be moved sequentially to a plurality of predetermined gauging positions, and selectively variable sequencing means connected to said control means for selectively altering the sequence of movement to said gauging positions,
g. feedback means including a shaft angle encoder adapted to generate positional signals connected to said screw and to said control means, and,
h. comparison means connected to said feedback means and to said control means for comparing said programmed signals with said positional signals.

2. An automatic gauge according to claim 1 wherein said gauge stop includes a finger pivotally mounted about a horizontal axis to said carriage and normally extending towards said brake in position to engage said work, the free end of said finger being formed with a plurality of stepped work-engaging faces, each of said faces being curved about a vertical axis, said finger being free to pivot upwardly and restrained against downward movement.

3. An automatic gauge according to claim 2 including height adjustment means mounted to said carriage and supporting said gauge stop.

4. An automatic gauge according to claim 1 including numerical display means connected to and responsive to said feedback means for displaying numerical data corresponding to the position of said carriage.

5. An automatic gauge according to claim 1 including means for generating overtravel and return signals to said motor to correct for backlash between said screw and said carriage.

* * * * *